United States Patent
Eng et al.

(10) Patent No.: US 12,395,494 B2
(45) Date of Patent: Aug. 19, 2025

(54) NETWORK INTERFERENCE CONTROL FOR WIRELESS TRANSMISSION

(71) Applicant: Comcast Cable Communications, LLC, Philadelphia, PA (US)

(72) Inventors: Adam Eng, Golden, CO (US); David Eng, Louisville, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 294 days.

(21) Appl. No.: 18/147,945

(22) Filed: Dec. 29, 2022

(65) Prior Publication Data

US 2024/0223570 A1 Jul. 4, 2024

(51) Int. Cl.
*H04L 9/40* (2022.01)
(52) U.S. Cl.
CPC ............ *H04L 63/105* (2013.01); *H04L 63/16* (2013.01); *H04L 2209/08* (2013.01); *H04L 2209/80* (2013.01)
(58) Field of Classification Search
CPC ... H04L 63/105; H04L 63/16; H04L 2209/08; H04L 2209/80
See application file for complete search history.

(56) References Cited

U.S. PATENT DOCUMENTS

| 10,069,592 B1 | 9/2018 | Krunz et al. | |
| 2006/0177063 A1* | 8/2006 | Conway | H04L 63/02 380/270 |
| 2021/0076200 A1* | 3/2021 | Agopsowicz | H04W 12/63 |
| 2023/0076156 A1* | 3/2023 | Abotabl | H04K 1/02 |

OTHER PUBLICATIONS

Liu et al., The Sound and the Fury: Hiding Communications in Noisy Wireless Networks with Interference Uncertainty, arXiv preprint arXiv:1712.05099, 2017, 13 pages.

* cited by examiner

*Primary Examiner* — Ellen Tran
(74) *Attorney, Agent, or Firm* — BakerHostetler

(57) ABSTRACT

An interference signal may be used to add a layer of security to a wireless communication. The interference signal may comprise media content, such as video, audio, text, or other content available to a user device via a media service. The wireless communication may be used to transmit a data signal, which may include sensitive data. The interference signal may be filtered to process the data signal.

20 Claims, 6 Drawing Sheets

NETWORK INTERFERENCE CONTROL FOR WIRELESS TRANSMISSION

BACKGROUND

Wireless communication transmitted locally between two devices transmissions is subject to interception by other local devices. While some communications may be encrypted others may not be, and the user may have no control over whether the communication is encrypted or not. Additionally, end users have no way to provide enhanced protection of wireless communications on an as needed basis. Thus, there is a need for more sophisticated techniques for securing wireless communication.

SUMMARY

Methods and systems for secure communication via a wireless network are disclosed. A network device, such as an access point or other device, may provide a wireless communication (e.g., or wireless communication session) for a user device. The user device may access services via the wireless communication and allow a user to specify a security level for the wireless communication. The network device, or other device (e.g., the user device, an additional network device), may transmit an interference signal to provide additional security for the wireless communication. The interference signal may include media content available to the user. For higher security levels, more complex data may be used, such as higher resolution video (e.g., ultra-high definition, high definition). For lower security levels, less complex data may be used, such as lower resolution video, audio, text content, or other content. The interference signal may be a physical waveform that is transmitted at the same time as another physical waveform carrying data for the wireless communication signal.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Additional advantages will be set forth in part in the description which follows or may be learned by practice. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF ILLUSTRATIVE EMBODIMENTS

Figure 1:
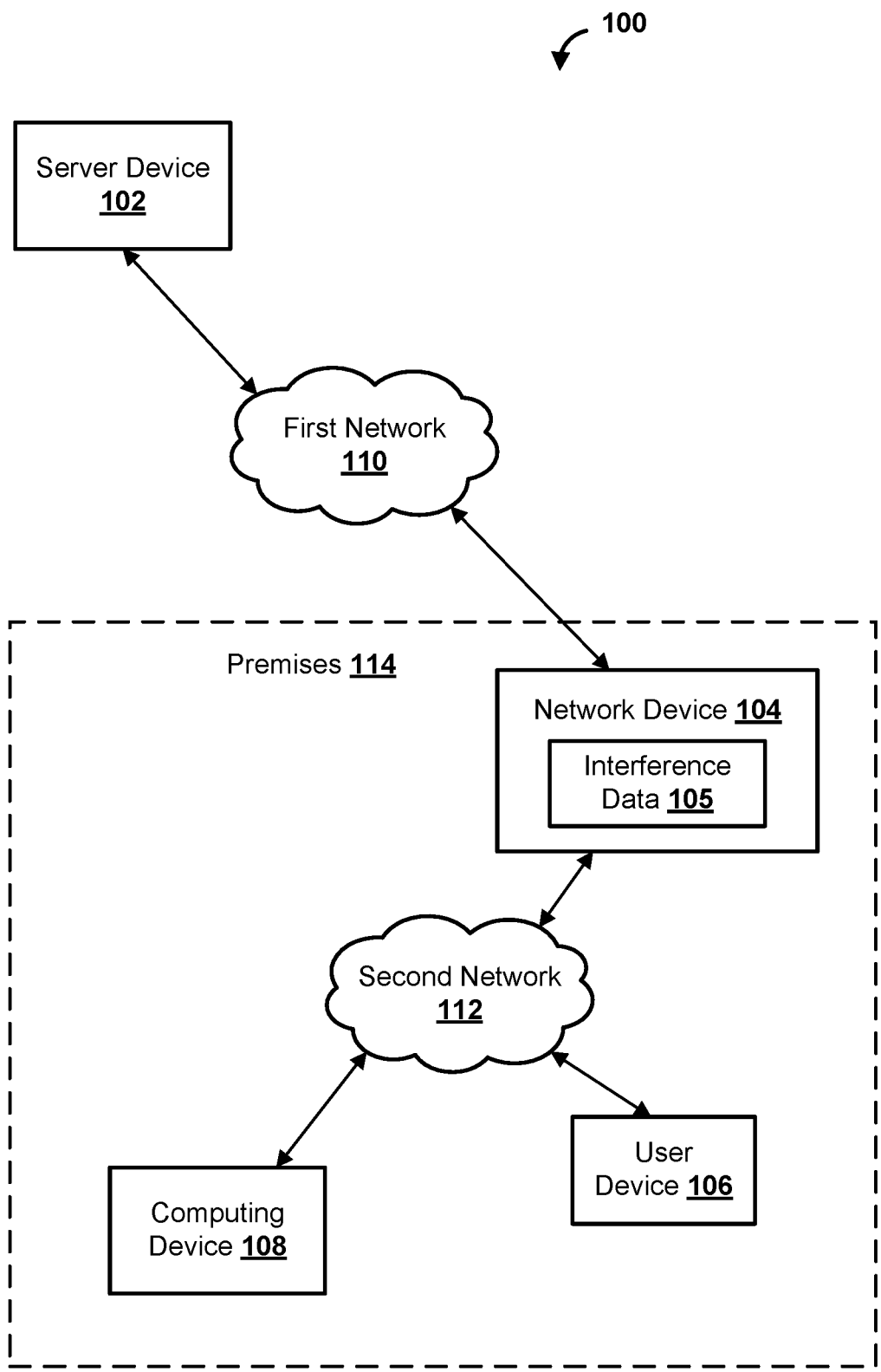
FIG. 1 shows an example system.

Currently, there are several methods in which data is encrypted and securely transmitted. The approaches typically rely on using multi-factor authentication to obtain access to encryption keys required in order to properly encrypt/decrypt the data. These methods exist only at the digital level and are always evolving due to the fact that hackers continue to learn new ways to exploit overlooked weaknesses. By adding another layer of encryption using physical layer techniques independent of the digital encryption techniques, the security of encrypted data may be greatly enhanced.

The present techniques provide improvements over conventional techniques and make "man in the middle" attacks and other malicious network activities more difficult to achieve. Even the most basic physical encryption approaches disclosed herein may add additional security over conventional data encryption. Even if a malicious party obtained a cryptographic key for decoding encrypted data, the party would not be able to read any intercepted data that applied the disclosed techniques. Instead, the intercepted data might be similar to a redacted message with many important parts missing.

Current digital data encryption works by modifying the data being transmitted from a device and changing the transmitted back at the end point. As a simplified illustration, the name Adam could be modified to the name Dave, which is then send to the endpoint. The endpoint may decrypt the name Dave back to Adam. Using the disclosed techniques, regardless of whether the name Adam or Dave is sent, the transmitted data would be difficult to interpret because an interference signal may interfere with the wireless waveform.

The disclosed techniques may comprise injecting noise (e.g., using a noise algorithm, noise content) on top of wireless transmissions so that the data effectively has a Multi-Factor Encryption (MFE). The noise may comprise any available data. A service entity may already provide various data to the user, such as media content (e.g., video, audio, text, streams, files). The service entity may organize the media content into various options for interference depending on the scenario and/or a security level associated with a wireless communication channel. An algorithm (e.g., a noise algorithm) may be used for selecting or otherwise generating the relevant data (e.g., media content) for noise. Using available media content is an improvement over conventional noise. The media content is more difficult to detect as interference because a user would be expected to stream media content. A malicious party would not be able to discern between using media content as interference and using media content for consumption of the media. The malicious party would have a more difficult time detecting sensitive information.

The noise may be added by generating constructive and/or destructive interference onto a waveform of a wireless communication channel. If a 2.4 GHz WiFi Signal is being used as a wireless communication channel, the noise may be transmitted on the same physical channel (e.g., the same frequency, frequency channel). The transmitted data may become effectively unreadable to a device that does not properly filter out the noise. The disclosed techniques may include the use of a wireless access point (e.g., a WiFi router). The wireless access point may communicate using specific frequencies (e.g., 2.4 Ghz, 5 Ghz) to send signals to devices. Interference signals may be added by the wireless access point, or by another device within range of the wireless access point. The disclosed techniques are not limited to wireless access points and may be used to secure communication between any two wireless receivers.

By having an independent layer of securing communication on top of the standard encryption methods, sensitive data may be more securely transmitted. Intercepted information may be partially "un-determinable" because it will appear to any device without a Physical Decryption layer application, like a Redacted Letter, where some information may look normally decrypted, while some will not. This has the potential of convincing the malicious party that they do not have the proper encryption keys.

The interference signals may be transmitted in the physical layer and may be considered as a form of physical encryption that may be independent of any digital encryption applied to data. A service entity may offer a variety of services, such as network access via one or more access points. The service entity may have a customer that wants to check a bank statement via a user device (e.g., mobile phone). The user may open an application on the user device and indicate a security level to use for a wireless communication session between the cell phone and an access point associated with the service entity. The application may cause (e.g., directly, or via a server) the access point to switch to (e.g., or start using) a dedicated wireless channel for the user device, such as by assigning the channel to communications associated a media access control (MAC) address of the user device. The access point may begin injecting noise (e.g., or a noise algorithm) known to the application over the dedicated channel. The user may proceed to communicate with sensitive services, such as by logging into a banking application and/or website. The user may perform standard multi-factor authentication and communicate with the sensitive service, such as by sending data using an encryption standard of the banking application.

This process may have the added benefit of ensuring the access point the user device is communicating with is not a malicious device masquerading as an authorized access point of the service entity. A verification process may be part of establishing the secure communication session between the access point and the user device. In some scenarios, the use of interference may function as a multi-factor encryption service. The encryption service may be established upon the access point satisfying a challenge, such as transmitting to the application of the service entity a PIN (e.g., from RSA SecurID token generator) recognizable by the user and/or application. If the access point is unable to satisfy the challenge, the application may output a notification indicating that the user connected to an unsecure access point. The application of the service entity on the user device may scramble the data sent to the access point making the data unreadable. The application may send fake data to the access point. If the access point treats the fake or scrambled data, as normal, access point may be indicated as unsecure.

There are a couple of ways in which noise may be generated on a given Frequency Band. One way is to directly apply a "noise algorithm" on the channel on the band being used for communicating between the two devices. This noise could be applied via a single antenna by mixing the noise data and the data for communication, such as by summing physical waveform information (e.g., amplitudes, symbol data, frequency information, etc.). This is different than the typical process of carrying two data streams on the same communication channel without causing interference between the two). Another way would be to have a first antenna transmit the actual data signal and a second dedicated antenna send the inference signal. The second antenna may tune to the same frequency band and channel being used for data signal and generate the constructive/destructive interference using the second antenna. In some scenarios, a tiered system of noise injection may be used, introducing more noise when the most sensitive data is being transmitted and/or when making initial connectivity. This approach would effectively be like dynamic redaction, as the most sensitive data would become the most convoluted in terms of noise. In some scenarios, the disclosed techniques may be relevant to one-on-one transmission, but the techniques could be extended to multiple hop scenarios if applied individually between each of the devices on each hop of the transmission.

FIG. 1 shows a block diagram of an example system 100. The system 100 may comprise a server device 102, a network device 104 (e.g., an access point, a gateway device, a modem, a router, a cable modem, or combination thereof), a user device 106, a computing device 108, or a combination thereof. It should be noted that while the singular term device is used herein, it is contemplated that some devices may be implemented as a single device or a plurality of devices (e.g., via load balancing). The server device 102, the network device 104, the user device 106, and/or the computing device 108 may each be implemented as one or more computing devices. Any device disclosed herein may be implemented using one or more computing nodes, such as virtual machines, executed on a single device and/or multiple devices.

The server device 102, the network device 104, the user device 106, and/or the computing device 108 may be configured to communicate via one or more networks, such as a first network 110 (e.g., a wide area network) and one or more second networks 112 (e.g., one or more local area networks). The first network 110 may comprise a content distribution and/or access network. The first network 110 may facilitate communication via one or more communication protocols. The first network 110 may comprise fiber, cable, a combination thereof. The first network 110 may comprise wired links, wireless links, a combination thereof, and/or the like. The first network 110 may comprise routers, switches, nodes, gateways, servers, modems, and/or the like.

The one or more second networks 112 may comprise one or more networks in communication with user device 106, the network device 104, the computing device 108, or a combination thereof. In some scenarios, the network device 104 and the computing device 108 may be implemented as a single device. In other scenarios, the computing device 108 may be a stand-alone device or integrated into another device, such as a television, remote control, set top box, media streaming device, user device (e.g., mobile phone, tablet), and/or the like. The one or more second networks 112 may comprise one or more networks at a premises 114. The premises 114 may be a customer premises, a business premises, a public premises, a private premises, and/or the like. The premises 114 may include an area within a coverage range (e.g., wireless range) of the network device 104. The premises 114 may comprise a property, dwelling, terminal, building, floor, and/or the like. The premises 114 may comprise different rooms, walls, door, windows, and/or the like. The user device 106 may move within the premises 114 and/or outside of the premises 114.

The network device 104 may comprise a computing device, an access point (e.g., wireless access point), a router, a modem, device controller (e.g., premises device controller) a combination thereof, and/or the like. The network device 104 may be configured to communicate using the one or more second networks 112 at the premises 114. The network device 104 may be configured to implement one or more services associated with the server device 102 (e.g., or with the premises 116, a user account), such as a network service, content service, a premises service, communication service, a combination thereof.

The server device 102 may be configured to provide one or more services, such as account services, application services, network services, content services, or a combination thereof. The server device 102 may comprise services for one or more applications on the user device 106. The server device 102 may generate application data associated with the one or more application services. The application data may comprise data for a user interface, data to update a user interface, data for an application session associated with the user device 106, and/or the like. The application data may comprise data associated with access, control, and/or management of the premises 116. The application data may comprise the premises data, updates to the premises data, and/or the like. The server device 102 may comprise services for managing the computing device 109. The computing device 108 may comprise a content device, such as a content streaming device, content browsing device, video recording device, set-top box, television, and/or the like. Additionally or alternatively, the computing device 108 may comprise one or more wireless antennas, radios, and/or the like.

The user device 106 may comprise a computing device, a smart device (e.g., smart glasses, smart watch, smart phone), a mobile device, a tablet, a computing station, a laptop, a digital streaming device, a set-top box, a streaming stick, a television, and/or the like. In some scenarios, a user may have multiple user devices, such as a mobile phone, a smart watch, smart glasses, a combination thereof, and/or the like. The user device 106 may be configured to communicate with the network device 104, the server device 102, the computing device 108, and/or the like. The user device 106 may be configured to output a user interface. The user interface may be output via the user interface via an application, service, and/or the like, such as a content browser. The user interface may receive application data from the server device 102. The application data may be processed by the user device 106 to cause display of the user interface.

The user interface may be displayed on a display of the user device 106. The display may comprise a television, screen, monitor, projector, and/or the like. The user interface may comprise a premises management application, a premises automation application, a content management application (e.g., for accessing video, audio, gaming, and/or other media), a smart assistant application, a virtual assistant application, a premises security application, network services application, or a combination thereof. The application may be configured to allow control of and/or sending commands to the premises 114 (e.g., the network device 104 and/or the computing device 108). The user interface may be configured to allow a user to configure settings associated with the network device 104, the computing device 108, and/or the like.

The user device 106, the server device 102, the network device 104, the computing device or a combination thereof may be configured to enable a security process based on interference and/or physical layer encryption. The security process may relate to a wireless communication and/or wireless communication session between the user device 106 and another device, such as the network device 104. The security process may cause a waveform to be transmitted using at least some of the same parameters, such as frequency (e.g., or frequency channel), as a wireless communication.

The user device 106 may be configured to determine a security level from a plurality of security levels for a wireless communication and/or wireless communication session with the network device 104. The user device 106 may determine the security level based on user input via the user interface. A user may select the security level. Determining the security level may comprise one or more of determining data indicative of a user selection of a security level or determining data indicative of the user device 106 accessing secure data over the wireless communication. The data indicative of the user selection may be based on user interaction with a user interface. The user interface may comprise connection management settings that allow the user to manage a current and/or future connection with the network device 104.

The user device 106 may determine the security level based on determining one or more conditions. The user device 106 may determine which application the user is accessing on the user device 106, a site (e.g., or service) that the user device 106 is attempting to access, and/or the like. Network information (e.g., packet information, sender information, recipient information, domain name, uniform resource address, protocol, port) associated with the user device 106 may be determined and/or analyzed to determine the security level. The network information, such as a packet, may be processed to determine destination information (e.g., URL, domain), sending information (e.g., URL, domain), protocol (e.g., secure protocol, unsecured protocol). The destination information (e.g., domain, URL) and/or sender information may be compared to information (e.g., domains, URLs) associated with one or more security levels of the plurality security levels to determine the security level. The protocol may be compared to protocols associated with one or more security levels of the plurality of security levels.

A database of conditions, network information, user behavior, and/or the like may be associated with corresponding security levels. In some scenarios, the server device 102 and/or the network device 104 may determine the security level (e.g., in addition or instead of the user device 106). The database may be stored at the user device 106, the server device 102, the network device 104, the computing device 108, or a combination thereof.

The plurality of security levels may comprise a first security level associated with media content having a first complexity. The plurality of security levels may comprise a second security level associated with media content having a second complexity different than the first complexity. The first complexity may comprise a first bit rate, resolution, quality, and/or type. The second complexity may comprise a second bit rate, resolution, quality, and/or type. The first complexity may comprise a first video resolution (e.g., ultra-high definition, 4k, high definition, 1080p). The second complexity may comprise a second video resolution (e.g., high definition, 720p, standard definition, 480p). The first complexity may comprise a first audio bit rate (e.g., 1411 kbps). The second complexity may comprise a second audio bit rate (e.g., 96, 160, 320 kbps).

The first complexity may comprise a first type of media content. The second complexity may comprise a second type of media content. The first type of media content may be a different type of content than the second type of content. Example types of media content may comprise video, audio, text, a game stream, or any combination thereof. The type of media content may comprise a file, a stream, user content (e.g., content understandable to a user), scrambled content, randomized content, or any combination thereof. A first security level of the plurality of security levels may be associated with media content comprising video. A second security level of the plurality of security levels may be associated with media content comprising one or more of text or audio.

The user device 106 may be configured to determine interference data 105. The interference data 105 may be any data used for generating an interference signal. The interference data 105 may be data used to generate a waveform of a physical transmission. The interference data 105 may be sent to and/or received by the network device 104. The network device 104 (e.g., or the user device 106, the computing device 108) may request the interference data 105, such as by requesting a data stream and/or one or more data files from the server device 102. The interference data 105 may comprise media content, noise data, an algorithm for generating noise data, and/or any available data. The interference data may comprise user viewable (e.g., comprehensible) content (e.g., content that user can understand).

The user device 106 may be configured to determine interference data 105 (e.g., media content, or other data) associated with the interference signal by the user device 106. The user device 106 may be configured to determine interference data 105 (e.g., media content, or other data) associated with the interference signal based on the security level. The interference data 105 (e.g., media content, or other data) may be available to the user device 106 for media consumption. Determining the interference data 105 (e.g., media content, or other data) may comprise accessing electronic program guide data indicating the interference data 105 (e.g., media content, or other data). The user device 106 may send a request to the server device 102 (e.g., or another server hosting the electronic program guide data). The user device 106, the network device 104, the computing device 108, the server device 102, or any combination thereof may determine the interference data 105 (e.g., media content, or other data) associated with the interference signal.

Determining the interference data 105 (e.g., media content, or other data) may comprise determining a user viewing history indicating the interference data 105 (e.g., media content, or other data). The user viewing history may be accessed and/or stored on the user device 106, the computing device 108, the network device 104, the server device 102, or any combination thereof. Determining the user viewing history may comprise determining a media asset associated with a user and determining a version of the media asset that matches the security level. The media asset associated with the user may comprise the media asset most recently viewed by the user, a media asset stored locally by the user (e.g., in cache, on the network device 104, on a streaming device), or a combination thereof.

Determining the interference data 105 (e.g., media content, or other data) may comprise using an algorithm to determine the interference data 105 (e.g., media content, or other data). The algorithm may be based on user information, timing information, and/or any other information. Determining the interference data 105 (e.g., media content, or other data) may comprise determining a location in the media content. Determining the location may comprise using an algorithm to determine a portion of the media content. Determining the location may comprise using a viewing history associated with a user of the user device 106 to determine a location (e.g., stream time, segment identifier) in the media content last viewed by a user. Determining the interference data 105 (e.g., media content, or other data) may comprise accessing a data structure associating a plurality of interference data 105 (e.g., media content, or other data) with corresponding security levels. The security level may be used to search the data structure for a matching security level and a corresponding interference data 105 (e.g., media content, or other data).

The network device 104 may determine the interference data 105 (e.g., media content, or other data) and/or receive an indication of the interference data 105 if determined by another device, such as the user device 106 and/or server device 102. The interference data 105 (e.g., media content, or other data) may be determined as part of establishing (e.g., or continuing to operate) a wireless communication and/or wireless communication session between the network device 104 and the user device 106. The network device 104 may be configured to send data indicative of establishing the wireless communication and/or wireless communication session. The network device 104 may be configured to send data indicative of establishing the wireless communication and/or wireless communication session to the user device 106. The data indicative of establishing the wireless communication and/or wireless communication session may be a response to data sent by the user device 106 to initiate the wireless communication session. The wireless communication and/or wireless communication session may be caused to be established by the user device 106, the server device 102, the network device 104, the computing device 108, or any combination thereof. The wireless communication and/or wireless communication session may be caused in response to a user of the user device 106 initiating and/or requesting the wireless communication and/or wireless communication session. In some scenarios, the wireless communication and/or wireless communication session may be established after ending a prior and/or current wireless communication and/or wireless communication session.

As part of establishing the wireless communication, a verification process may be performed. The user device 106 may verify that the network device 104 is an authentic access point associated with the service entity. The verification process may be based on a credential, code, identifier, token, and/or the like. A verification service may be used to which both the user device 106 and network device 104 have access. The verification service may send the credential, code, identifier, token, and/or the like to each of the devices. A challenge question may be sent to the network device 104. If the network device 104 is unable to correctly answer the challenge, then the network device 104 may not be verified. The verification process may comprise sending a fake user credential to the network device 104. If the network device 104 accepts the fake credential, the access point may fail the verification process.

The network device 104 may be configured to cause a physical layer encryption process (e.g., or interference process, security process) to be performed for the wireless communication and/or wireless communication session. The network device 104 may be configured to cause transmission of the interference data 105 (e.g., media content, or other data) as an interference signal to the wireless communication and/or wireless communication session. The network device 104 may be configured to cause transmission of the interference data 105 (e.g., media content, or other data) as the interference signal to the wireless communication and/or wireless communication session based on determining the interference data 105 (e.g., media content, or other data). Additionally or alternatively, the network device 104 may cause a wireless radio of a different device, such as the computing device 108 to transmit the interference signal.

The wireless communication and/or wireless communication session may be between the user device 106 and the network device 104. Causing the transmission of the interference data 105 (e.g., media content, or other data) as an interference signal may comprise causing transmission, via a single wireless radio, of the interference data 105 (e.g., media content, or other data) with data associated with the wireless communication and/or wireless communication session. Data communicated via the wireless communication and/or wireless communication session may be cryptographically encoded.

The wireless communication and/or wireless communication session may be facilitated using a first wireless radio. A data signal (e.g., including the actual data the user aims to communicate) may be transmitted via the first wireless radio. The interference data 105 (e.g., media content, or other data) may be transmitted as an interference signal using a second wireless radio different than the first wireless radio. Additionally or alternatively, the first wireless radio may send both the data signal and the interference signal. Depending on the configuration, the first wireless radio and the second wireless radio may be located in a variety of devices. Both the first wireless radio and the second wireless radio may be in a single device, such as the network device 104, the computing device 108, or the user device 104 (e.g., the user device 104 may also send the interference signal if the interference data is stored on the user device 104). The first wireless radio and the second wireless radio may be in separate devices, such as any combination of the network device 104, the computing device 108, or the user device 106. In some scenarios, the wireless communication and/or wireless communication session may be between the user device 106 and an additional computing device (e.g., different than the network device 104), such the computing device 108. The network device 104 may transmit the interference signal to add physical layer security to the wireless communication and/or wireless communication session between the user device 106 and an additional computing device.

The user device 106 (e.g., or other device if interference is transmitted by the user device 106) may be configured to receive the signal (e.g., or wireless communication) comprising the interference signal and a data signal. The user device 106 may be configured to receive the signal comprising the interference signal and a data signal via the wireless communication and/or wireless communication session. Receiving a signal comprising the interference signal may comprise receiving a transmission, via a single wireless radio, comprising both the interference signal (e.g., with the media content) with the data signal (e.g., with the secured data). The data signal communicated via the wireless communication and/or wireless communication session may be cryptographically encoded.

The user device 106 may be configured to determine the data signal. The user device 106 may be configured to determine the data signal based on filtering the interference signal from the received signal using the interference data 105 (e.g., media content, or other data). Determining the data signal may comprise using communication signals, parameters, and/or codes in the received signal to determine the data signal. Determining the data signal may comprise using a media encoding and/or decoding process to filter interference data 105 (e.g., media content, or other data) from the received signal. Using a media encoding and/or decoding process may comprise decoding the media asset in the received signal, re-encoding the media asset, and filtering the re-encoded copy of the media asset from the received signal. Determining the data signal may comprise accessing a file and/or stream of the interference data 105 (e.g., media content, or other data) and using the file and/or stream to filter the interference signal from the received signal. Determining the data signal may comprise using pattern recognition and/or other algorithm based on properties of the interference data 105 (e.g., media content, or other data) to filter the interference signal from the received signal.

The user device 106 may ignore (e.g., or filter) the interference signal in the received signal. The user device 106 may comprise a signal generator configured to generate a filter waveform that is the inverse of the interference signal. The filter waveform may be applied to the received signal to cause destructive interference to the interference signal, resulting in only the data signal remaining. The sender (e.g., network device 104, or any noise injection system) and the receiver (e.g., user device 106, or any noise removal system) may be configured to agree upon (e.g., or both have the same process for determining) which media asset will be used and at what timestamp (e.g., timestamp of the asset, timestamp of the transmission). Both the sender and the receiver may have a copy of the interference data and/or an inverse copy of the interference data (e.g., a decoding base that will generate an inverse of the original interference data, such an inverse copy of a media asset).

Figure 2:
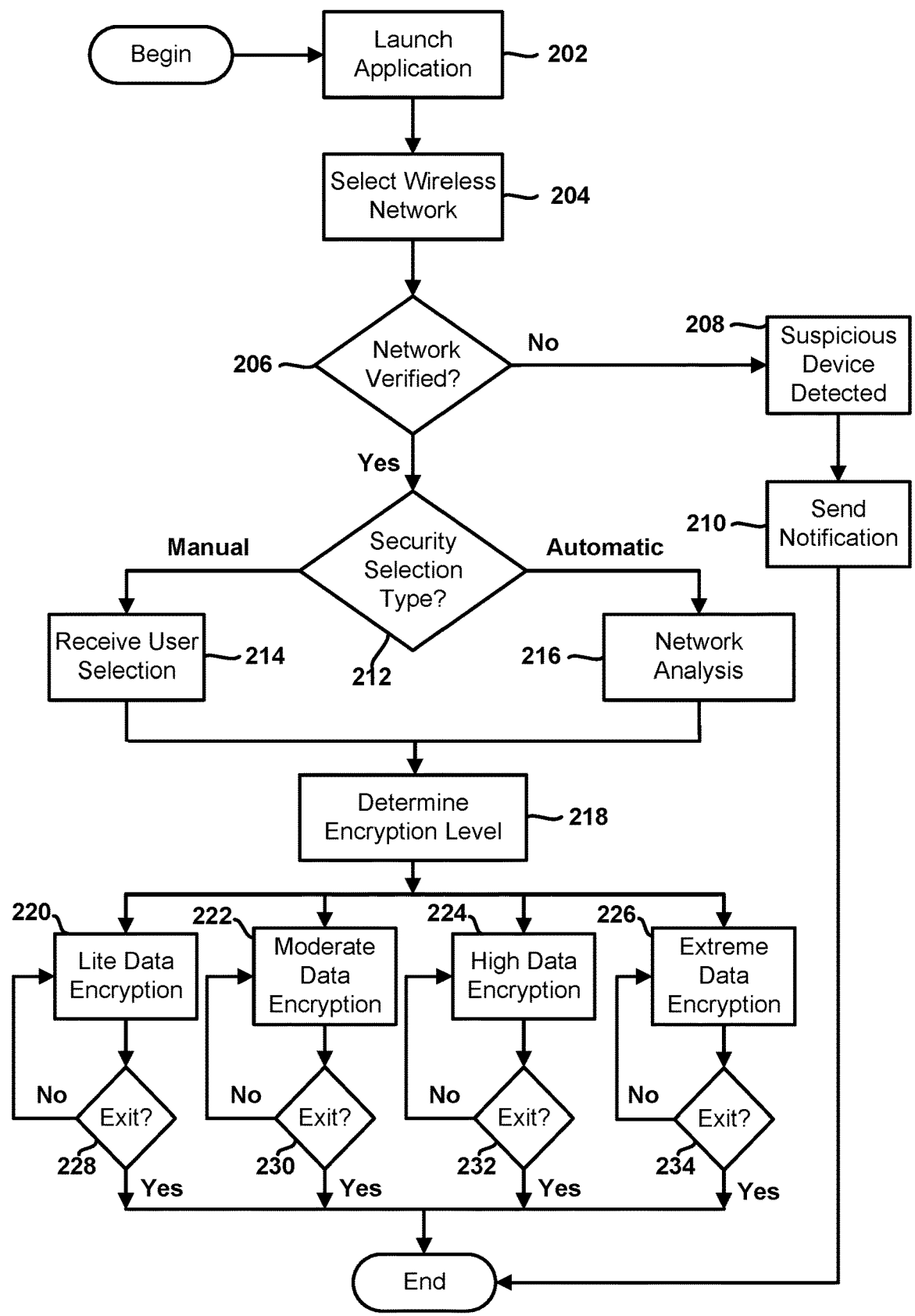
FIG. 2 shows an example method.

FIG. 2 show a flow chart of an example method. Physical layer security (e.g., encryption, noise) may be enabled by the following one or more of the steps below. Any of the devices of FIG. 1 may separately or together perform any of the steps of the example method of FIG. 2.

At step 202, an application for managing the physical layer encryption (e.g., a mobile application associated with the service entity) may be launched (e.g., loaded, brought into the foreground, changed to active status). A user may open the application on a user device. At step 204, a wireless network may be determined (e.g., selected). The user may select the wireless network from a list of wireless networks. A connection with an access point (e.g., or other wireless device) hosting the network may be established.

At step 206, it may be determined whether the access point is verified (e.g., authorized, authenticated) or not. Performing verification of the access point may include sending the access point a credential, code, identifier, token, and/or the like. Performing verification of the access point may include requesting the access point to send a credential, code, identifier, token, and/or the like. A verification service may be used to which both the user device and authentic access points have access. The verification service may send the credential, code, identifier, token, and/or the like to each of the devices. A challenge question may be sent to the access point. If the access point is unable to correctly answer the challenge, then the access point may not be verified. The verification process may comprise sending a fake user credential to the access point. If the access point accepts the fake credential, the access point may fail the verification process.

If the access point is not verified, then step 208 may be performed. At step 208, a determination may be made that a suspicious device is detected. At step 210, a notification may be sent indicating detection of the suspicious device. If the access point is verified, then step 212 may be performed.

At step 212, a determination may be made as to what type of security selection process is being used—a manual process or an automatic process (e.g., based on a trigger condition, determining a condition, without direct user instruction selecting a security level). If manual, step 214 may be performed by receiving data indicating user selection of a security level. If automatic, step 216 may be performed by causing a network analysis process to analyze network data associated with the user device. Automatic selection may be based on user activity, such as communication with a server, opening an application. Communication from the user device may be analyzed to determine network information, such as a domain, address, protocol, and/or the like. The network information may be compared to network information (e.g., domain, address, protocol) associated with corresponding security levels. Some financial related services (e.g., banking) may be associated with an extreme level of security. Other financial services (e.g., insurance, investing) may be associated with a high level of security. Email services may be associated with a moderate level of security. Social media platform services may be associated with a moderate level and/or lite level of security. News related network information may be associated with a low level of security or no level of security. The network information of these services may be stored and associated with the appropriate level of security. Upon detection of a communication to any of the services, waveform interference may be added, removed, and/or modified to match the corresponding level of waveform encryption associate with the security level.

The security level (e.g., or level of waveform encryption) may be selected manually (e.g., based on user input indicating the security level). The user may access the application to indicate the level of security. A user interface may allow a user to associate a security level with a communication session, start a new communication session with a new security level, and/or the like. The user interface may allow a user to indicate a selection of a security level from among a plurality of security levels. The plurality of security levels may comprise four levels, such as low, moderate, high, extreme. It should be noted that any number of levels may be used. The user may be able to dynamically adjust the security levels as desired. Dynamic adjustment may comprise adjustment based on trigger conditions, such as visiting site, a scheduled time, a specific user logs in, a specific application is opened, suspicious network activity detected, location (e.g., public place, business location, home location), connection parameters (e.g., bandwidth, latency, speed). If the speed of a connection is too slow; the user may opt for a lower level of security. If more security is needed for a sensitive communication, the user may opt for a higher level of security. In some scenarios, both automatic and manual selection processes may be used together. The user may also set parameters for automatic selection, such as associating specific sites and/or types of sites (e.g., news, social media, financial) with corresponding security levels. Dynamic adjust may comprise a user manually changing the security level at any given time.

At step 218, a waveform encryption level (e.g., or physical encryption level) may be determined. The security levels may be associated with corresponding waveform encryption levels. The security level determined from step 214 and/or step 216 may be used to determine a corresponding waveform encryption level.

Waveform encryption levels may comprise lite data encryption (e.g., a first level), moderate data encryption (e.g., a second level), high data encryption (e.g., a third level), extreme encryption (e.g., a fourth level). The lite data encryption may generate an interference waveform based on data having a first complexity (e.g., lite complexity). The data having a first complexity may comprise text, such as electronic program guide text (e.g., which may be rotated in regular intervals). The moderate data encryption may generate an interference waveform based on data having a second complexity (e.g., moderate complexity). The data having a second complexity may comprise image data (e.g., and related metadata), such as images representing content asset (e.g., asset poster) and/or metadata (e.g., which may be rotated in regular intervals). The high data encryption may generate an interference waveform based on data having a third complexity (e.g., high complexity). The data having a third complexity may comprise a first quality of video, such as standard definition quality video (e.g., video of a content asset with video playback quality set to low). The extreme data encryption may generate an interference waveform based on data having a third complexity (e.g., high complexity). The data having a fourth complexity may comprise a second quality of video, such as high definition quality video (e.g., video of a content asset with video playback quality set to high).

At steps 220, 220, 224, and 226, waveform encryption may be performed according to the corresponding encryption level determined in step 218. Periodically, a check may be performed at one or more of steps 228, 230, 232, or 234 to determine whether to end the waveform encryption process. Various conditions and/or triggers may be checked, such as whether the communication session is still active, whether the user is still interacting with the mobile device, whether a particular site and/or service is still being accessed, whether a timer has elapsed, change in location, change in network parameters (e.g., bandwidth, speed, latency, signal strength), or any combination thereof.

An example waveform encryption process may comprise the following. A media access control (MAC) address associated with a user device may be determined. The MAC address (e.g., or other user credential) may be used to determine the last successful login Timestamp for streaming media content. Begin streaming media content according to the security level determined for a wireless communication session. The media content may be a predetermined video (e.g., such as a G rated video) specified by the service entity. The video may be determined based on an algorithm used to select content based on features of the content, a rotating schedule, or other process.

One or more of the devices in the wireless communication session may determine parameters for the waveform encryption process. The parameters may be determined according to a predefined process (e.g., algorithm, schedule). The process may direct each device to a specific media asset (e.g., last played media asset), a specific portion of the media asset (e.g., a timestamp, segment, the beginning, last segment viewed), or a combination thereof. In some scenarios, one or more of the parameters may be communicated to the devices (e.g., from a server, from the device initiating the communication) associated with the wireless communication session. Streaming of the content during the communication session may mask the data that is being transmitted via the wireless communication session. If the media content reaches an end during the communication session, an additional media asset (e.g., or other interference data) may automatically be started. The additional media asset may be the next media content in a sequence (e.g., playlist), a series (e.g., the next episode), and/or compilation. In some scenarios, the waveform encryption process may rotate through an encryption asset list (e.g., that may make it appear that the user is binge watching a series or set of movies, scrolling through a program guide, or looking up show details). In some scenarios, only a portion of the media content (e.g., media asset) may be transmitted as interference. A portion may include a single track, alternative segments, a trick play version of the content, and/or the like.

Waveform encryption may be accomplished using one or more antennas, such as a first antenna (e.g., first radio) and a second antenna (e.g., second radio). The access point may comprise the first antenna (e.g., or first radio). The access point may comprise the second antenna. The first antenna may transmit a stream of media content, such as a movie. The stream may begin at the last viewed timestamp (e.g., HH:MM:SS)+the current time (MM:SS). The second antenna may transmit communication between a website (e.g., a banking website) and the user device. The frequency used for transmission for both the first antenna and the second antenna may be the same (e.g., or within a same channel, same range). The transmission of the stream of media content may be generated such that the stream of the media content interferes (e.g., both constructively and destructively) with the communication between the website and the user device.

Figure 3:
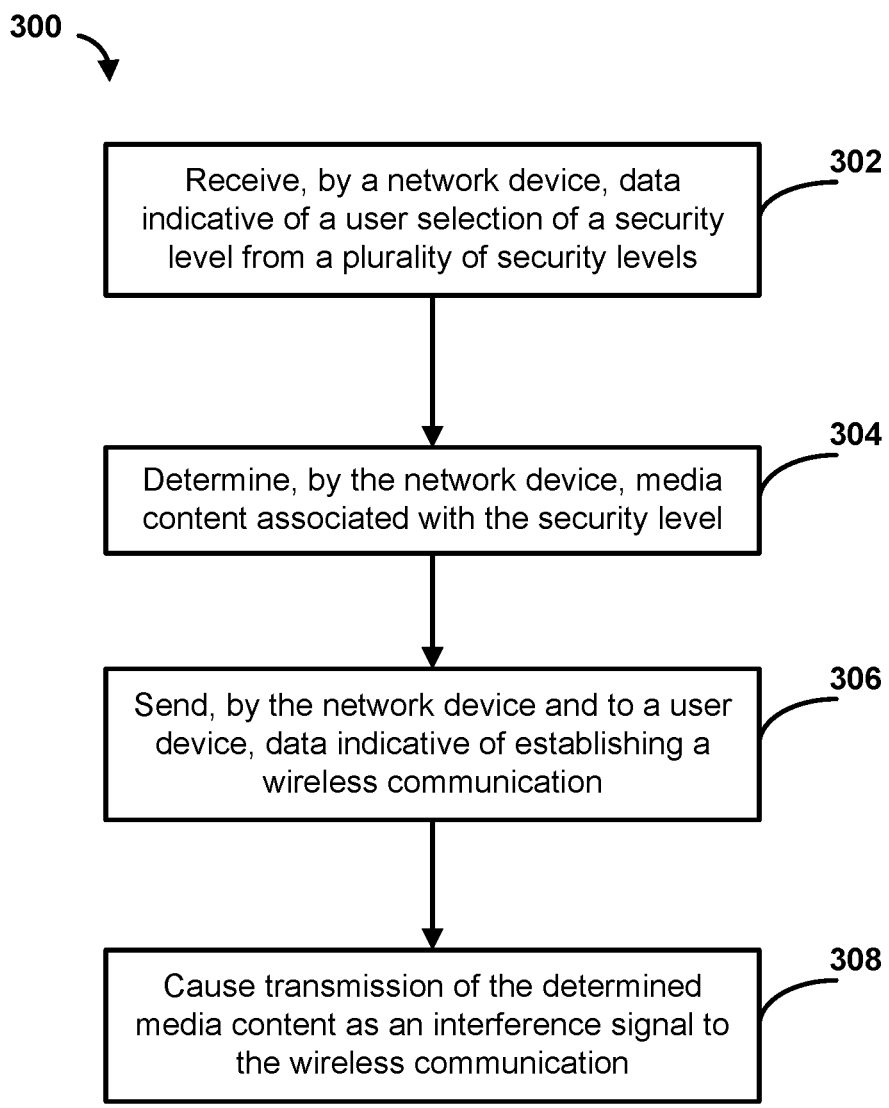
FIG. 3 shows an example method.

FIG. 3 shows an example method. The method 300 may comprise a computer implemented method for providing a service (e.g., a media service, a network service, a communication service). A system and/or computing environment, such as the system 100 of FIG. 1 and/or the computing environment of FIG. 6, may be configured to perform the method 300. The method 300 may be performed in connection with the premises and/or system illustrated in FIG. 1. Any of the features of the methods of FIGS. 4-5 may be combined with any of the features and/or steps of the method 300 of FIG. 3.

At step 302, data indicative of a user selection of a security level, from a plurality of security levels, for a wireless communication (e.g., a wireless communication session) with a user device may be received. The data indicative of the user selection of a security level for the wireless communication with a user device may be received by a network device. The network device may comprise one or more of a router, a gateway device, an access point, or a content streaming device.

The plurality of security levels may comprise a first security level associated with first media content having a first complexity. The plurality of security levels may comprise a second security level associated with second media content having a second complexity different than the first complexity. The first complexity may comprise a first bit rate, resolution, and/or quality. The second complexity may comprise a second bit rate, resolution, and/or quality. The first complexity may comprise a first video resolution (e.g., ultra-high definition, 4k, high definition, 1080p). The second complexity may comprise a second video resolution (e.g., high definition, 720p, standard definition, 480p). The first complexity may comprise a first audio bit rate (e.g., 1411 kbps). The second complexity may comprise a second audio bit rate (e.g., 96, 160, 320 kbps).

The first complexity may comprise a first type of media content. The second complexity may comprise a second type of media content. The first type of media content may be a different type of content than the second type of content. Example types of media content may comprise video, audio, text, a game stream, or any combination thereof. The type of media content may comprise a file, a stream, user content (e.g., content understandable to a user), scrambled content, randomized content, or any combination thereof. A first security level of the plurality of security levels may be associated with media content comprising video. A second security level of the plurality of security levels may be associated with media content comprising one or more of text or audio. The data indicative of the user selection of the security level may comprise data indicative of the user device accessing secure data over the wireless communication.

Receiving the data indicative of the user selection may comprise receiving the data indicative of the user selection from a user device. The user device may comprise a computing device, a mobile device, a tablet device, a content device, and/or the like. The data indicative of the user selection may be based on user interaction with a user interface. The user interface may comprise connection management settings that allow the user to manage a current and/or future connection with the network device.

At step 304, media content associated with the security level may be determined (e.g., accessed, received). The media content associated with the security level may be determined by the network device. The media content may be available to the user device. The media content may be available to the user device as part of a content service, for media viewing, for user consumption, and/or the like. The media content may comprise one or more of video content, audio content, text content, gaming content. The media content may comprise user viewable (e.g., comprehensible) content (e.g., content that user can understand). Determining the media content may comprise accessing electronic program guide data indicating the media content. Determining the media content may comprise determining a user viewing history indicating the media content. Determining the user viewing history may comprise determining a media asset associated with a user and determining a version of the media asset (e.g., 4k, 1080p, 720p, 480p) that matches the security level.

The media asset associated with the user may comprise the media asset most recently viewed by the user, a media asset stored locally by the user (e.g., in cache, on the network device, on a streaming device), or a combination thereof. Determining the media content may comprise using an algorithm to determine the media content. The algorithm may be based on user information, timing information, and/or any other information. Determining the media content may comprise determining a location in the media content. Determining the location may comprise using an algorithm to determine a portion of the media content. Determining the location may comprise using a viewing history associated with a user of the user device to determine a location (e.g., stream time, segment identifier) in the media content last viewed by a user. Determining the media content may comprise accessing a data structure associating a plurality of media content with corresponding security levels. The security level may be used to search the data structure for a matching security level and a corresponding media content.

At step 306, data indicative of establishing the wireless communication (e.g., or wireless communication session) may be sent. The data indicative of establishing the wireless communication may be sent by the network device. The data indicative of establishing the wireless communication may be sent to the user device. The data indicative of establishing the wireless communication may be any data and/or messages (e.g., reply, request, acknowledgement) used to negotiate and/or generate a wireless communication (e.g., a wireless communication session). The data indicative of establishing the wireless communication may be sent in response to a request from the user device. The data indicative of establishing the wireless communication may be sent based on a message from a server device. The data indicative of establishing the wireless communication may be sent based on the network device detecting a condition associated with generating a secure wireless communication (e.g., a secure communication session).

At step 308, transmission of the determined media content as an interference signal may be caused. The transmission may be caused as part of and/or in connection with the wireless communication (e.g., the wireless communication session). The wireless communication may be between the user device and the network device. The transmission of the media content as the interference signal may be caused based on determining the media content. The wireless communication may be facilitated using a first wireless radio. Causing the transmission of the media content as an interference signal may comprise causing transmission, via a single wireless radio (e.g., the first wireless radio), of the media content with data associated with the wireless communication. Causing the transmission of the media content as the interference signal may comprise transmitting the media content using a second wireless radio different than the first wireless radio. The first wireless radio may be comprised in a network device. The second wireless radio may be comprised in the network device or an additional network device.

The wireless communication (e.g., the wireless communication session) may be between the user device and an additional computing device different than the computing device transmitting the interference signal. Causing transmission of media content as the interference signal may comprise causing the network device to transmit the interference signal while the additional computing device communicates with user device. The wireless communication may be between the user device network device. Causing transmission of media content as the interference signal may comprise causing the additional computing device to transmit the interference signal while the network device facilitates the wireless communication with the user device. Data communicated via the wireless communication may be cryptographically encoded.

Figure 4:
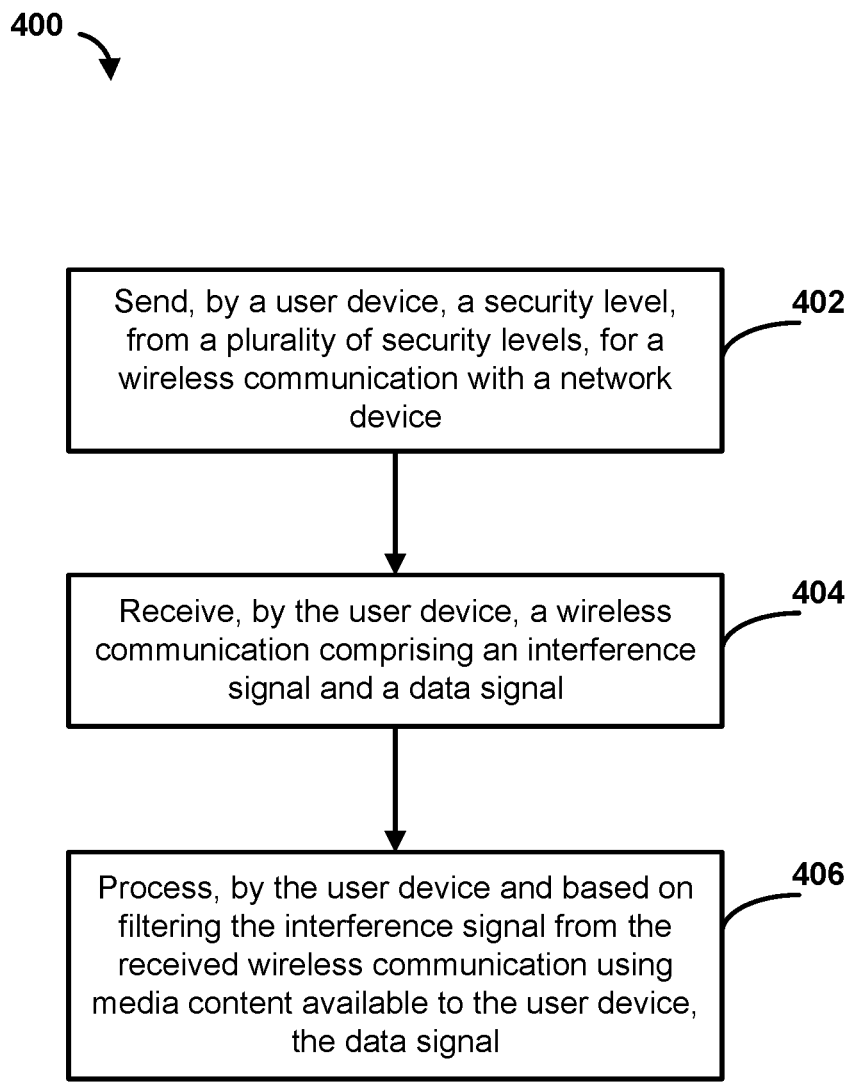
FIG. 4 shows an example method.

FIG. 4 shows an example method. The method 400 may comprise a computer implemented method for providing a service (e.g., a media service, a network service, a communication service). A system and/or computing environment, such as the system 100 of FIG. 1 and/or the computing environment of FIG. 6, may be configured to perform the method 400. The method 400 may be performed in connection with the premises and/or system illustrated in FIG. 1. Any of the features of the methods of FIG. 3 and FIG. 5 may be combined with any of the features and/or steps of the method 400 of FIG. 4.

At step 402, a security level from a plurality of security levels may be sent. The plurality of security levels may be for a wireless communication (e.g., a wireless communication session) with a network device. The security level may be determined and/or sent by a user device. The user device may comprise a computing device, a mobile device, a tablet device, a content device. The plurality of security levels may comprise a first security level associated with media content having a first complexity. The plurality of security levels may comprise a second security level associated with media content having a second complexity different than the first complexity. The first complexity may comprise a first bit rate, resolution, quality, and/or type. The second complexity may comprise a second bit rate, resolution, quality, and/or type. The first complexity may comprise a first video resolution (e.g., ultra-high definition, 4k, high definition, 1080p). The second complexity may comprise a second video resolution (e.g., high definition, 720p, standard definition, 480p). The first complexity may comprise a first audio bit rate (e.g., 1411 kbps). The second complexity may comprise a second audio bit rate (e.g., 96, 160, 320 kbps).

The first complexity may comprise a first type of media content. The second complexity may comprise a second type of media content. The first type of media content may be a different type of content than the second type of content. Example types of media content may comprise video, audio, text, a game stream, or any combination thereof. The type of media content may comprise a file, a stream, user content (e.g., content understandable to a user), scrambled content, randomized content, or any combination thereof. A first security level of the plurality of security levels may be associated with media content comprising video. A second security level of the plurality of security levels may be associated with media content comprising one or more of text or audio.

Sending the security level may be based on one or more of data indicative of a user selection of a security level or data indicative of the user device accessing secure data over the wireless communication. The data indicative of the user selection may be based on user interaction with a user interface. The user interface may comprise an interface for establishing a wireless communication (e.g., wireless communication session, wireless connection) with the network device. The user interface may comprise an interface for connecting to a network service. The user may select the security level as part of connecting to the network service and/or establishing the wireless communication. The user interface may comprise connection management settings (e.g., including a setting for a security level, or a setting associating a security level with a particular location, domain, or type of website) that allow the user to manage a current and/or future connection with the network device. The data indicative of the user device accessing secure data over the wireless communication may be determined by processing network data, such as a packet, to determine destination information (e.g., URL, domain), sending information (e.g., URL, domain), protocol (e.g., secure protocol, unsecured protocol). The destination information (e.g., domain, URL) and/or sender information may be compared to information (e.g., domains, URLs) associated with one or more security levels of the plurality security levels to determine the security level. The protocol may be compared to protocols associated with one or more security levels of the plurality of security levels.

Media content associated with an interference signal may be determined. The media content associated with the interference signal may be determined by the user device. The media content associated with the interference signal may be determined based on the security level. The media content may be available to the user device (e.g., for media consumption, as part of a content service, for playback and/or user viewing). The media content may comprise user viewable (e.g., comprehensible) content (e.g., content that a user can understand). Determining the media content may comprise accessing electronic program guide data indicating the media content. Determining the media content may comprise determining a user viewing history indicating the media content. The user device and a network device associated with the wireless communication may be preprogrammed to determine the media content for the wireless communication based on a media selection process. The media selection process may comprise rules for determining the media content based on the security level.

Determining the user viewing history may comprise determining a media asset associated with a user and determining a version of the media asset that matches the security level. The media asset associated with the user may comprise the media asset most recently viewed by the user, a media asset stored locally by the user (e.g., in cache, on the network device, on a streaming device), or a combination thereof. Determining the media content may comprise using an algorithm to determine the media content. The algorithm may be based on user information, timing information, and/or any other information. Determining the media content may comprise determining a location in the media content. Determining the location may comprise using an algorithm to determine a portion of the media content. Determining the location may comprise using a viewing history associated with a user of the user device to determine a location (e.g., stream time, segment identifier) in the media content last viewed by a user. Determining the media content may comprise accessing a data structure associating a plurality of media content with corresponding security levels. The security level may be used to search the data structure for a matching security level and a corresponding media content.

At step 404, a wireless communication (e.g., a signal, combination of signals) comprising the interference signal and a data signal may be received. The wireless communication may be received by the user device. The wireless signal may be received via a wireless communication (e.g., wireless communication session).

The wireless communication (e.g., or wireless communication session) may be facilitated using a first wireless radio. The first wireless radio may be a wireless radio of the network device. Receiving the wireless communication may comprise receiving the data signal from the first wireless radio (e.g., of the network device, or other device). Receiving the wireless signal may comprise receiving the interference signal (e.g., the media content) from a second wireless radio different than the first wireless radio. Receiving the wireless communication may comprise receiving the interference signal (e.g., the media content) from the first wireless radio. Receiving the wireless communication may comprise receiving a transmission, via a single wireless radio, of the media content with data associated with the wireless communication (e.g., wireless communication session). The data signal communicated via the wireless communication session may be cryptographically encoded (e.g., using data based encoding before generating the physical waveforms of a signal).

At step 406, the data signal may be determined. The data signal may be determined by the user device. The data signal may be determined based on filtering the interference signal from the received wireless communication (e.g., or signal, combined signal) using the media content. Determining the data signal may comprise using communication signals, parameters, and/or codes in the received wireless communication to determine the data signal. Determining the data signal may comprise using a media encoding and/or decoding process to filter media content from the received wireless communication. Using a media encoding and/or decoding process may comprise decoding the media asset in the received wireless communication, re-encoding the media asset, and filtering the re-encoded copy of the media asset from the received signal. Determining the data signal may comprise accessing a file and/or stream of the media content and using the file and/or stream to filter the interference signal from the received wireless communication. Determining the data signal may comprise using pattern recognition and/or other algorithm based on properties of the media content to filter the interference signal from the received signal.

Figure 5:
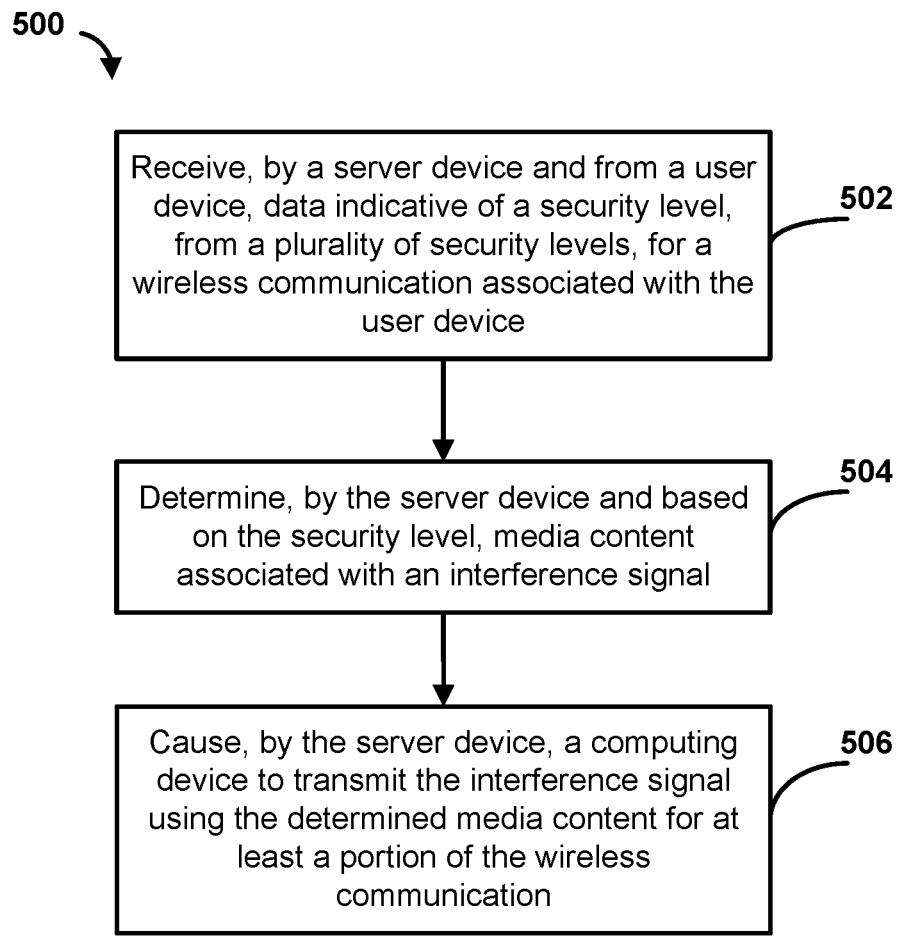
FIG. 5 shows an example method.

FIG. 5 shows an example method. The method 500 may comprise a computer implemented method for providing a service (e.g., a media service, a network service, a communication service). A system and/or computing environment, such as the system 100 of FIG. 1 and/or the computing environment of FIG. 6, may be configured to perform the method 500. The method 500 may be performed in connection with the premises and/or system illustrated in FIG. 1. Any of the features and/or steps of the methods of FIGS. 3-4 may be combined with any of the features of the method 500 of FIG. 5.

At 502, data indicative of a security level, from a plurality of security levels, may be received. The security level may be for a wireless communication (e.g., a wireless communication session) associated with a user device. The data indicative of the security level may be received by a server device. The data indicative of the security level may be received from the user device. The plurality of security levels may comprise a first security level associated with media content having a first complexity. The plurality of security levels may comprise a second security level associated with media content having a second complexity different than the first complexity. The first complexity may comprise a first bit rate, resolution, quality, and/or type. The second complexity may comprise a second bit rate, resolution, quality, and/or type. The first complexity may comprise a first video resolution (e.g., ultra-high definition, 4k, high definition, 1080p). The second complexity may comprise a second video resolution (e.g., high definition, 720p, standard definition, 480p). The first complexity may comprise a first audio bit rate (e.g., 1411 kbps). The second complexity may comprise a second audio bit rate (e.g., 96, 160, 320 kbps).

The first complexity may comprise a first type of media content. The second complexity may comprise a second type of media content. The first type of media content may be a different type of content than the second type of content. Example types of media content may comprise video, audio, text, a game stream, or any combination thereof. The type of media content may comprise a file, a stream, user content (e.g., content understandable to a user), scrambled content, randomized content, or any combination thereof. A first security level of the plurality of security levels may be associated with media content comprising video, and wherein a second security level of the plurality of security levels may be associated with media content comprising one or more of text or audio.

Receiving the data indicative of the security level may be based on a determination that the user device is accessing (e.g., or attempting to access, indicating a future access) secure data. The determination that the user device is accessing secure data over the wireless communication may be based on processing network data, such as a packet, to determine destination information (e.g., URL, domain), sending information (e.g., URL, domain), protocol (e.g., secure protocol, unsecured protocol). The destination information (e.g., domain, URL) and/or sender information may be compared to information (e.g., domains, URLs) associated with one or more security levels of the plurality security levels to determine the security level. The protocol may be compared to protocols associated with one or more security levels of the plurality of security levels. Receiving the data indicative of the security level may be based on user interaction with a user interface. The user interface (e.g., application) may comprise connection management settings that allow the user to manage a current and/or future connection with the network device. The user interface (e.g., or user device) may be configured to determine the security level based on the user interaction and send the data indicative of the security level to the server device.

At step 504, media content associated with an interference signal may be determined. The media content associated with the interference signal may be determined by the server device. The media content associated with the interference signal may be determined based on the security level. The media content may be available (e.g., as part of a content service) to the user device. The media content may be user comprehensible (e.g., viewable, understandable to a user, in a language understandable to the user). The media content may be available for media consumption (e.g., viewing, access). Determining the media content may comprise accessing electronic program guide data indicating the media content. Determining the media content may comprise determining a user viewing history indicating the media content. Determining the user viewing history may comprise determining a media asset associated with a user and determining a version of the media asset that matches the security level. The media asset associated with the user may comprise the media asset most recently viewed by the user, a media asset stored locally by the user (e.g., in cache, on the network device, on a streaming device), or a combination thereof.

Determining the media content may comprise using an algorithm to determine the media content. The algorithm may be based on user information, timing information, and/or any other information. Determining the media content may comprise determining a location in the media content. Determining the location may comprise using an algorithm to determine a portion of the media content. Determining the location may comprise using a viewing history associated with a user of the user device to determine a location (e.g., stream time, segment identifier) in the media content last viewed by a user. Determining the media content may comprise accessing a data structure associating a plurality of media content with corresponding security levels. The security level may be used to search the data structure for a matching security level and a corresponding media content.

At step 506, a computing device may be caused to transmit the interference signal using the media content for at least a portion of the wireless communication (e.g., the wireless communication session). The computing device may be caused by the server device. The computing device may be caused based on the media content. The wireless communication (e.g., the wireless communication session) may be between the user device and an additional computing device different than the computing device transmitting the interference signal. Causing the computing device to transmit the interference signal may comprise causing the computing device to transmit the interference signal and causing the additional computing device to facilitate the communication (e.g., wireless communication, wireless communication session) while the interference signal is being transmitted. The wireless communication may be between the user device and the computing device. Causing the computing device to transmit the interference signal may comprise causing transmission, via a single wireless radio, of the media content with data associated with the wireless communication. Data communicated via the wireless communication may be cryptographically encoded. The wireless communication (e.g., the wireless communication session) may be facilitated using a first wireless radio (e.g., of the computing device, of another device local to the premises where the user device is located). Causing the computing device to transmit the interference signal may comprise causing the computing device to transmit the media content using a second radio different than the first wireless radio.

Figure 6:
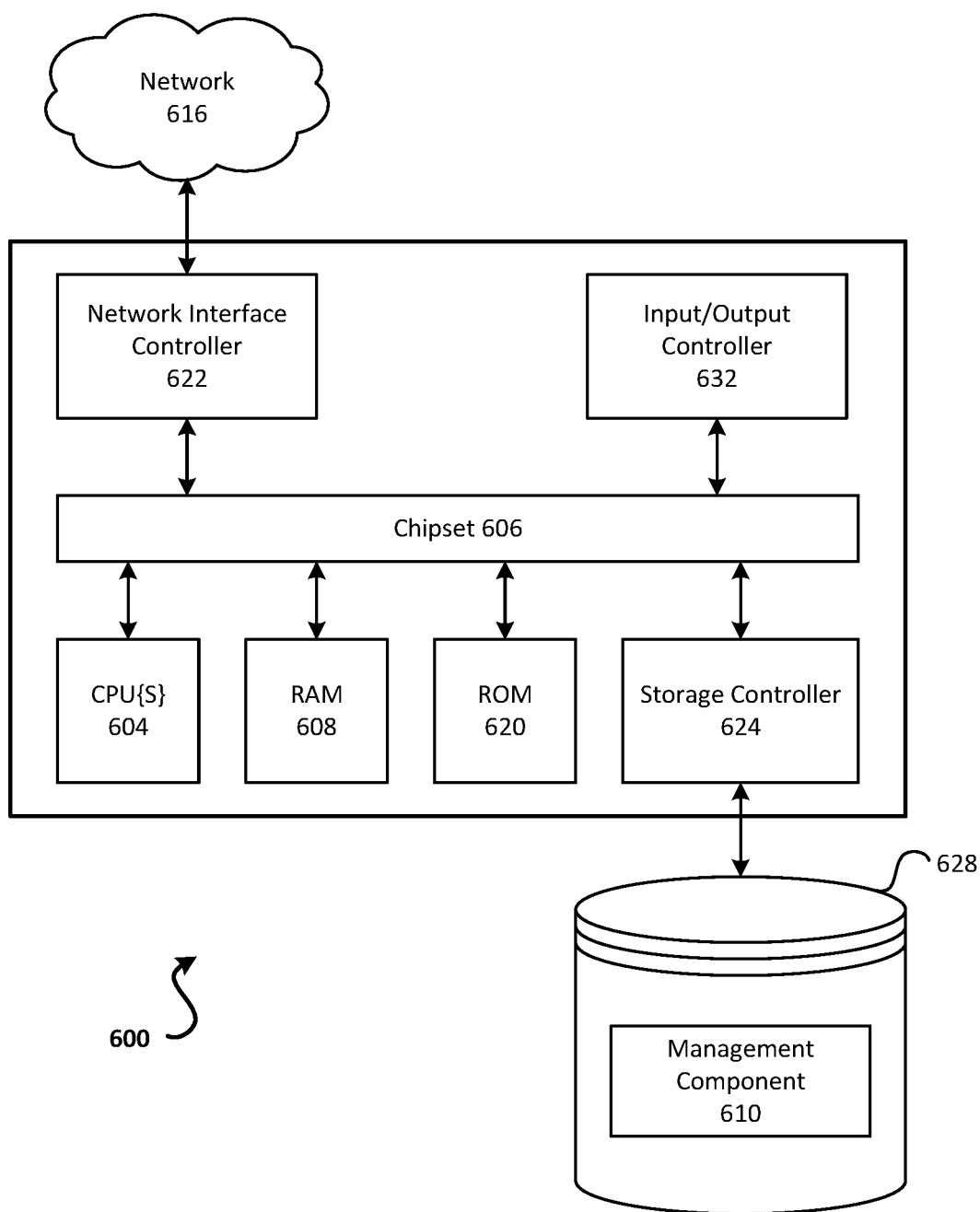
FIG. 6 shows an example computing device.

FIG. 6 depicts a computing device that may be used in various aspects, such as the servers and/or devices depicted in FIGS. 1, and 2A-B. With regard to the example architecture of FIG. 1, the server device 102, network device 104, user device 106, and the computing device 108 may each be implemented in an instance of a computing device 600 of FIG. 6.

The computer architecture shown in FIG. 6 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIG. 1, FIG. 2. FIG. 3, FIG. 4, and FIG. 5.

The computing device 600 may include a baseboard, or "motherboard," which is a printed circuit board to which a multitude of components or devices may be connected by way of a system bus or other electrical communication paths. One or more central processing units (CPUs) 604 may operate in conjunction with a chipset 606. The CPU(s) 604 may be standard programmable processors that perform arithmetic and logical operations necessary for the operation of the computing device 600.

The CPU(s) 604 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 604 may be augmented with or replaced by other processing units, such as GPU(s) 605. The GPU(s) 605 may comprise processing units specialized for but not necessarily limited to highly parallel computations, such as graphics and other visualization-related processing.

A chipset 606 may provide an interface between the CPU(s) 604 and the remainder of the components and devices on the baseboard. The chipset 606 may provide an interface to a random access memory (RAM) 608 used as the main memory in the computing device 600. The chipset 606 may further provide an interface to a computer-readable storage medium, such as a read-only memory (ROM) 620 or non-volatile RAM (NVRAM) (not shown), for storing basic routines that may help to start up the computing device 600 and to transfer information between the various components and devices. ROM 620 or NVRAM may also store other software components necessary for the operation of the computing device 600 in accordance with the aspects described herein.

The computing device 600 may operate in a networked environment using logical connections to remote computing nodes and computer systems through local area network (LAN) 616. The chipset 606 may include functionality for providing network connectivity through a network interface controller (NIC) 622, such as a gigabit Ethernet adapter. A NIC 622 may be capable of connecting the computing device 600 to other computing nodes over a network 616. It should be appreciated that multiple NICs 622 may be present in the computing device 600, connecting the computing device to other types of networks and remote computer systems.

The computing device 600 may be connected to a mass storage device 628 that provides non-volatile storage for the computer. The mass storage device 628 may store system programs, application programs, other program modules, and data, which have been described in greater detail herein. The mass storage device 628 may be connected to the computing device 600 through a storage controller 624 connected to the chipset 606. The mass storage device 628 may consist of one or more physical storage units. A storage controller 624 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 600 may store data on a mass storage device 628 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 628 is characterized as primary or secondary storage and the like.

For example, the computing device 600 may store information to the mass storage device 628 by issuing instructions through a storage controller 624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 may further read information from the mass storage device 628 by detecting the physical states or characteristics of one or more particular locations within the physical storage units.

In addition to the mass storage device 628 described above, the computing device 600 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 600.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), solid state drive, flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 628 depicted in FIG. 6, may store an operating system utilized to control the operation of the computing device 600. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 628 may store other system or application programs and data utilized by the computing device 600.

The mass storage device 628 or other computer-readable storage media may also be encoded with computer-executable instructions, which, when loaded into the computing device 600, transforms the computing device from a general-purpose computing system into a special-purpose computer capable of implementing the aspects described herein. These computer-executable instructions transform the computing device 600 by specifying how the CPU(s) 604 transition between states, as described above. The computing device 600 may have access to computer-readable storage media storing computer-executable instructions, which, when executed by the computing device 600, may perform the methods described in relation to FIG. 1, FIG. 2A-B, FIG. 3, FIG. 4, and FIG. 5.

A computing device, such as the computing device 600 depicted in FIG. 6, may also include an input/output controller 632 for receiving and processing input from a number of input devices, such as a keyboard, a mouse, a touchpad, a touch screen, an electronic stylus, or other type of input device. Similarly, an input/output controller 632 may provide output to a display, such as a computer monitor, a flat-panel display, a digital projector, a printer, a plotter, or other type of output device. It will be appreciated that the computing device 600 may not include all of the components shown in FIG. 6, may include other components that are not explicitly shown in FIG. 6, or may utilize an architecture completely different than that shown in FIG. 6.

As described herein, a computing device may be a physical computing device, such as the computing device 600 of FIG. 6. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. As used in the specification, the phrases "A and/or B" and "A or B" mean (A), (B), or (A and B). The phrases "A, B, and/or C" and "A, B, or C" mean (A), (B), (C), (A and B), (A and C), (B and C), or (A, B, and C).

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, or in addition, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
receiving, by a network device, data indicative of a user selection of a security level, from a plurality of security levels, for a wireless communication with a user device;
determining, by the network device, media content that is available to the user device and that is associated with the security level;
sending, by the network device and to the user device, data indicative of establishing the wireless communication; and
causing transmission of the determined media content as an interference signal to the wireless communication.

2. The method of claim 1, wherein the plurality of security levels comprises a first security level associated with first media content having a first complexity and a second security level associated with second media content having a second complexity different than the first complexity.

3. The method of claim 1, wherein a first security level of the plurality of security levels is associated with media content comprising video, and wherein a second security level of the plurality of security levels is associated with media content comprising one or more of text or audio.

4. The method of claim 1, wherein the data indicative of the user selection of the security level comprises data indicative of the user device accessing secure data over the wireless communication.

5. The method of claim 1, wherein causing the transmission of the determined media content as an interference signal comprises causing transmission, via a single wireless radio, of the media content with data associated with the wireless communication.

6. The method of claim 1, wherein data communicated via the wireless communication is cryptographically encoded.

7. The method of claim 1, further comprising facilitating the wireless communication using a first wireless radio, wherein causing the transmission of the determined media content as the interference signal comprises transmitting the determined media content using a second wireless radio different than the first wireless radio.

8. A method comprising:
sending, by a user device, data indicative of a security level, from a plurality of security levels, for a wireless communication;
receiving, by the user device, a wireless communication comprising an interference signal and a data signal; and
processing, by the user device and based on filtering the interference signal from the received wireless communication using media content available to the user device, the data signal.

9. The method of claim 8, wherein the plurality of security levels comprises a first security level associated with media content having a first complexity and a second security level associated with media content having a second complexity different than the first complexity.

10. The method of claim 8, wherein a first security level of the plurality of security levels is associated with media content comprising video, and wherein a second security level of the plurality of security levels is associated with media content comprising one or more of text or audio.

11. The method of claim 8, further comprising determining the security level based on one or more of data indicative of a user selection of the security level or data indicative of the user device accessing secure data over the wireless communication.

12. The method of claim 8, wherein receiving the wireless communication comprising the interference signal and the data signal comprises receiving a transmission, via a single wireless radio, of the media content with data associated with the wireless communication.

13. The method of claim 8, wherein the user device and a network device sending the wireless communication are preprogrammed to determine the media content for the wireless communication based on a media selection process.

14. The method of claim 8, further comprising facilitating the wireless communication using a first wireless radio, wherein receiving the wireless communication comprising the interference signal and the data signal comprises receiving the media content from a second wireless radio different than the first wireless radio.

15. A method comprising:
receiving, by a server device and from a user device, data indicative of a security level, from a plurality of security levels, for a wireless communication associated with the user device;
determining, by the server device and based on the security level, media content that is available to the user device and that is associated with an interference signal; and
causing, by the server device, a computing device to transmit the interference signal using the determined media content for at least a portion of the wireless communication.

16. The method of claim 15, wherein the plurality of security levels comprises a first security level associated with media content having a first complexity and a second security level associated with media content having a second complexity different than the first complexity.

17. The method of claim 15, wherein a first security level of the plurality of security levels is associated with media content comprising video, and wherein a second security level of the plurality of security levels is associated with media content comprising one or more of text or audio.

18. The method of claim 15, wherein causing the computing device to transmit the interference signal comprises causing transmission, via a single wireless radio, of the media content with data associated with the wireless communication.

19. The method of claim 15, wherein data communicated via the wireless communication is cryptographically encoded.

20. The method of claim 15, further comprising facilitating the wireless communication using a first wireless radio, wherein causing the computing device to transmit the interference signal comprises causing the computing device to transmit the determined media content using a second radio different than the first wireless radio.

* * * * *